J. L. LA DRIERE.
WHEEL.
APPLICATION FILED APR. 1, 1912.
1,049,497.
Patented Jan. 7, 1913.
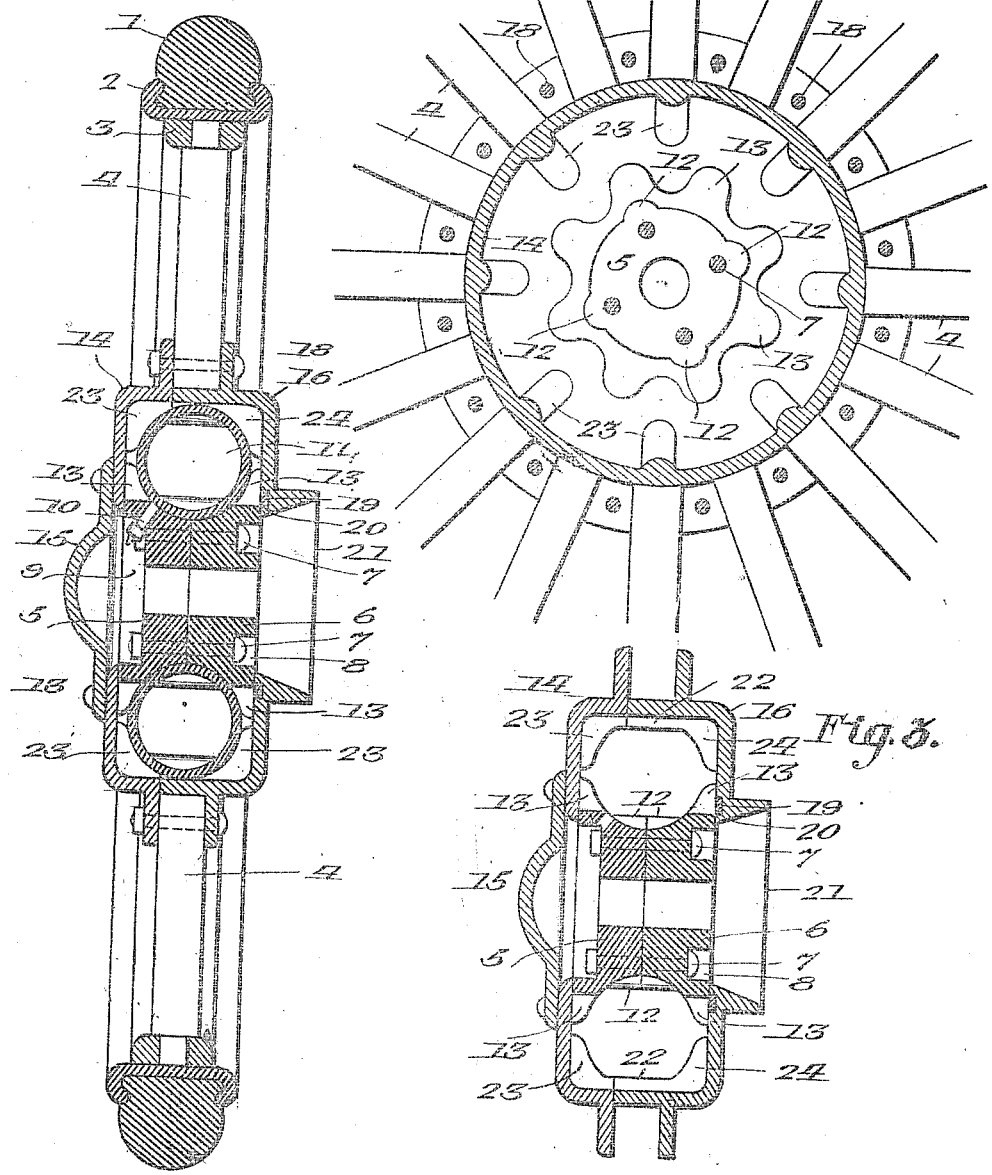

UNITED STATES PATENT OFFICE

JOSEPH L. LA DRIERE, OF ALBUQUERQUE, NEW MEXICO.

WHEEL.

1,049,497. Specification of Letters Patent. Patented Jan. 7, 1913.

Application filed April 1, 1912. Serial No. 687,900.

*To all whom it may concern:*

Be it known that I, JOSEPH L. LA DRIERE, citizen of the United States, residing at Albuquerque, in the county of Bernalillo and State of New Mexico, have invented new and useful Improvements in Wheels, of which the following is a specification.

My present invention has to do with wheels that embody and are cushioned by an annular pneumatic or inflated tube; and it contemplates the provision of a wheel, of the type stated, that is possessed of high resiliency and is, at the same time, simple and durable in construction.

The invention in all of its details will be fully understood from the following description and claims when the same are read in connection with the drawings, accompanying and forming part of this specification, in which:

Figure 1 is a diametrical section of the wheel constituting the best practical embodiment of my invention that I have as yet devised. Fig. 2 is a detail longitudinal vertical section of the central portion of the wheel with the annular inflated tube omitted. Fig. 3 is a detail transverse section showing the central portion of the wheel with the annular inflated tube omitted.

Similar numerals of reference designate corresponding parts in all of the views of the drawings.

The outer portion of my novel wheel may be of any construction consonant with the purpose of my invention without involving departure from the scope thereof as claimed. I prefer, however, to have said outer portion comprise a solid rubber tire 1, a channeled steel rim 2, a wood felly 3 at the inner side of the rim, and wood spokes 4 fixed at their outer ends in said felly and extending inward therefrom and toward the center of the wheel in conventional manner.

The hub of the wheel is formed by two sections 5 and 6, of steel or any other metal or material suitable to hub purposes, and it will here be understood that without affecting my invention the hub may be fixed in any approved manner on a shaft, or on the other hand may be arranged to turn loosely on an axle spindle and may be equipped with conventional or any other suitable anti-friction means. Such means forms no part of my present invention, and therefore is not illustrated. The hub sections 5 and 6 are arranged side by side, and are connected together by transverse bolts 7. In order to prevent these bolts 7 from interfering with free movement vertically of the outer portion of the tube casing, I arrange the heads of the bolts in an annular groove 8 in the inner hub section 6, while the outer ends of the bolts and the nuts thereon are arranged in a recess 9 formed in the outer side of the outer section 5. It will also be noted that for the purpose stated the outer end of the inflation tube 10 of the annular inflated tube 11 is disposed in the said recess 9, and within the vertical plane of the outer side of the hub section 5. The periphery of the hub formed by the sections 5 and 6 is grooved and in the bottom of the said groove are provided four equi-distant transverse ribs 12. Each of the sections 5 and 6 is also provided with eight teeth 13; the said teeth 13 of one hub section being transversely alined with the corresponding teeth of the other hub section. It will also be understood in this connection that the teeth 13 are arranged immediately adjacent the sides of the hub and extend radially outward beyond the ribs 12.

The outer portion of the casing inclosing the tube 11 is formed by an outer section 14 to which is detachably connected a closure plate 15, and an inner section 16 which abuts at 17 against the section 14 and serves in connection with the same to receive the inner ends of the spokes 4. Bolts 18, disposed between the spokes 4 are employed to connect the sections 14 and 16 together and to clamp the spokes between said sections. At 19 the section 16 is provided with an annular groove, and in the said groove is arranged a suitable packing 20 which bears against the inner side of the hub section 6 and serves to prevent dust and dirt gaining access to the tube 11 and the space in which said tube is disposed, and this without interfering with free vertical movement of the hub in the outer casing portion formed by the sections 14 and 16. The section 16 is also provided with a mud guard 21 and when desired the perimeter of the said mud guard may be employed to receive the pressure of a brake band, not shown. The outer casing portion is equipped with eight equi-distant transverse ribs 22, which are arranged in radial alinement with the spaces between the teeth 13 of the hub sections 5 and 6. The said ribs 22 are provided with end portions 23 and 24 which are arranged adjacent the side walls of the sections 14 and 16, respectively. By virtue of the hub being provided with the ribs 12 and the teeth 13, and the outer portion of the casing being provided with the ribs 22, and the end portions 23 and 24 thereon, it will be manifest that the pneumatic tube 11 will be strongly keyed to the hub and the outer casing portion so as to prevent creeping of the tube around the hub or creeping of the outer casing portion around the tube. It will also be manifest that such construction assures the transmission of rotary motion from the hub to the outer portion of the wheel, or from such outer portion of the wheel to the hub, and this without the imposition of undue strain on the pneumatic tube, and without detracting from the resiliency or cushioning capacity of the inflated tube. This latter is due to the fact that the pressure against the tube will be in spots. In other words, the pneumatic or inflated tube will be held between projections on the hub and outer casing portion, and will be allowed to be resilient as if the stress was only at one spot or place at one time, as contradistinguished from a tube that is disposed in an annular chamber the wall or walls of which are plain and free of projections such as ribs or teeth.

Incidental to the use of my novel wheel, it will be manifest that the hub is enabled to move freely in a vertical direction in the outer casing portion, and is efficiently cushioned in said outer casing portion, with the result that the transmission of shock and jar from the outer portion of the wheel to the hub and the vehicle to which the hub is connected, is effectually prevented.

While I prefer to employ the specific numbers of ribs and teeth as stated, it is obvious that the said numbers may be varied without involving departure from the scope of my claimed invention.

In addition to the advantages ascribed to my novel wheel, it will be noted that the same is simple and inexpensive in construction, and by reason of such construction is well adapted to withstand the usage to which wheels of corresponding character are ordinarily subjected.

Having described my invention, what I claim and desire to secure by Letters-Patent, is:

1. In a wheel, the combination of a hub having a circumferential groove and transverse ribs in the bottom of said groove, and a larger number of teeth at the sides of the groove, an annular cushion disposed in the said groove of the hub and surrounding the hub, and an outer casing portion surrounding the hub and the annular cushion in a manner to permit of vertical movement of the hub within said casing portion and having transverse ribs arranged in radial alinement with the spaces between the teeth of the hub and also having inwardly extending end portions on the said ribs, for the purpose set forth.

2. In a wheel, the combination of a hub comprising an inner section having an annular groove in its inner side and an outer section having a central recess in its outer side, said hub having a circumferential groove and transverse ribs in the bottom of the groove and a greater number of teeth on the sides of the groove, transverse bolts connecting the said sections and having their heads disposed in said annular groove, nuts mounted on the outer ends of said bolts and disposed in said central recess; an inflated tube surrounding the hub and seated in the circumferential groove thereof and having an inflation tube the outer end of which is disposed in said central recess; and an outer casing portion surrounding the hub and the inflated tube in a manner to permit of vertical movement of the hub within said casing portion and having transverse ribs arranged in radial alinement with the spaces between the teeth of the hub and also having inwardly extending end portions on the said ribs, annular packing bearing against the inner side of the hub, and a closure plate detachably connected with the outer side of said casing portion.

In testimony whereof I have hereunto set my hand in presence of two subscribing witnesses.

JOSEPH L. LA DRIERE.

Witnesses:
  Jas. B. Reed,
  Victor S. Craun.